United States Patent
Milford (10) Patent No.: US 11,523,151 B2
(45) Date of Patent: Dec. 6, 2022

(54) RENDERING STREAM CONTROLLER

(71) Applicant: ARRIS Enterprises LLC, Suwanee, GA (US)

(72) Inventor: Matthew A. Milford, Waxhaw, NC (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/396,637

(22) Filed: Apr. 27, 2019

(65) Prior Publication Data

US 2019/0364308 A1 Nov. 28, 2019

Related U.S. Application Data

(60) Provisional application No. 62/666,160, filed on May 3, 2018.

(51) Int. Cl.
*H04N 21/2343* (2011.01)
*H04N 21/258* (2011.01)

(52) U.S. Cl.
CPC . *H04N 21/23439* (2013.01); *H04N 21/25833* (2013.01)

(58) Field of Classification Search
CPC .................. H04N 21/25833; H04N 21/23439
See application file for complete search history.

(56) References Cited

U.S. PATENT DOCUMENTS

| | | | | |
|---|---|---|---|---|
| 2012/0297423 | A1* | 11/2012 | Kanojia | H04N 21/25808 725/39 |
| 2014/0149442 | A1* | 5/2014 | Apte | G06F 16/22 707/758 |
| 2014/0333633 | A1* | 11/2014 | Zhang | G09G 5/003 345/503 |
| 2014/0358668 | A1* | 12/2014 | Fredinburg | G06Q 30/02 705/14.66 |
| 2016/0337426 | A1* | 11/2016 | Shribman | H04L 65/612 |
| 2017/0140494 | A1* | 5/2017 | Marchiori | G06F 8/51 |
| 2019/0208203 | A1* | 7/2019 | Tsukuba | H04N 19/46 |

* cited by examiner

*Primary Examiner* — William G Trost, IV
*Assistant Examiner* — Abdelbasst Talioua
(74) *Attorney, Agent, or Firm* — Chernoff, Vilhauer, McClung & Stenzel, LLP (57) ABSTRACT

A system is provided for a rendering stream distributor controller for use with a plurality of content sources, a HTML code repository, a plurality of video rendering engines and a distribution network. The rendering stream distributor controller includes an outbound IP address inventory system, a video rendering engine and network elements inventory system and a rendering stream controller. The rendering stream controller is able to provide a stream instruction, based on one of a plurality of outbound IP addresses, one of a plurality of HTML content identification data, and one of a plurality of sets of HTML code so as to instruct one of the plurality of video rendering engines to output an MPEG transport stream.

20 Claims, 4 Drawing Sheets

RENDERING STREAM CONTROLLER

The present application claims priority from U.S. Provisional Application No. 62/666,160 filed May 3, 2018, the entire disclosures of which is incorporated herein by reference.

BACKGROUND

Embodiments of the invention relate to HTML stream to adaptive bitrate (ABR) linear stream conversion systems.

SUMMARY

Aspects of the present invention are drawn to a rendering stream distributor controller for use with a plurality of content sources, a HTML code repository, a plurality of video rendering engines and a distribution network. The plurality of content sources is able to provide a plurality of respective sets of HTML content data. The HTML code repository is able to provide a plurality of sets of HTML code. Each of the plurality of video rendering engines is able to obtain a respective one of the plurality of sets of HTML content data, a respective one of the plurality of sets of HTML code and to output a respective MPEG transport stream. The rendering stream distributor controller includes an outbound IP address inventory system, a video rendering engine and network elements inventory system and a rendering stream controller. The outbound IP address inventory system has a plurality of outbound IP addresses stored therein. The video rendering engine and network elements inventory system has stored therein, a plurality of HTML content identification data associated with the respective plurality of plurality of respective sets of HTML content data. The rendering stream controller is able to provide a stream instruction, based on one of the plurality of outbound IP addresses, one of the plurality of HTML content identification data, and one of the plurality of sets of HTML code so as to instruct one of the plurality of video rendering engines to output an MPEG transport stream stream.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

A source content provider, e.g. and Internet website, may want to provide website data to a service provider, e.g., a cable provider, so as to eventually provide the website data to an end user device such as a television or set-top box. Unfortunately many conventional televisions and set-top boxes are unable to decode internet data. Accordingly, to accomplish this feat, the website data, which is originally in and Hypertext Markup Language (HTML5) format, is first arranged into a HyperText Transfer Protocol (HTTP) live stream (HLS). The HLS is then transcoded into a Motion Picture Experts Group (MPEG) transport stream (TS) format. The MPEG TS is then transmitted through a distribution network, which then further transcodes the MPEG TS to an adaptive bitrate (ABR) linear stream format for delivery to the service provider.

A prior art stream rendering system for delivering website originated data in the form of an ABR linear stream format will now be described with additional reference to FIGS. 1-2.

Figure 1:
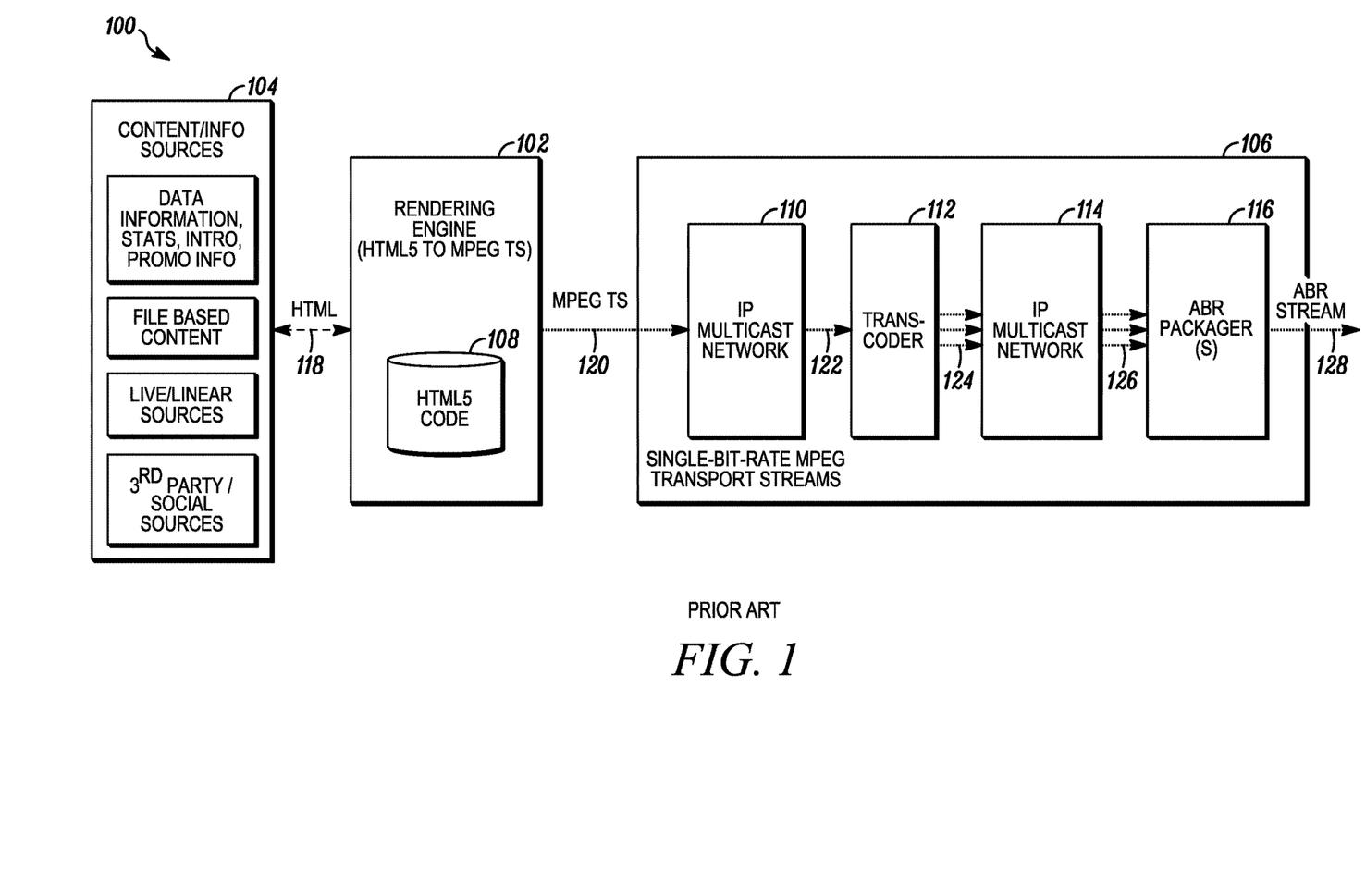
FIG. 1 illustrates a prior art stream rendering system.

FIG. 1 illustrates a prior art stream rendering system 100.

As shown in the figure, a stream rendering system 100 includes a rendering engine 102, a web content source provider 104 and a distribution network 106.

Rendering engine includes an HTML5 code component 108, which includes HTML5 code that enables HTML5 data to be formatted into an HLS.

Distribution network 106 includes an internet protocol (IP) multicast network 110, transcoder 112, a network 114 and an ABR packaging component 116.

In operation, rendering engine 102 obtains desired web-based content from web content source provider 104. For purposes of discussion, let the desired web-based content be a video clip, a graph of statistical data, an advertisement and a second video clip.

Rendering engine 102 additionally includes content decisions that determine how the web-based content is to be arranged. For example, content decisions may instruct the web-based source content to be arranged to include the first video clip disposed in a first linear slot, followed by an advertisement content in a second linear slot, which is then followed by the image of the graph of statistical data for a period of time as a third linear slot, which is then followed by the second video clip in a fourth linear slot, etc.

After receiving desired web-based content from web content source provider 104, rendering engine 102 assembles an HLS using the HTML5 code within HTML5 code component 108.

Finally, rendering engine 102 converts the HLS into and MPEG TS. This will be described with reference to FIG. 2.

Figure 2:
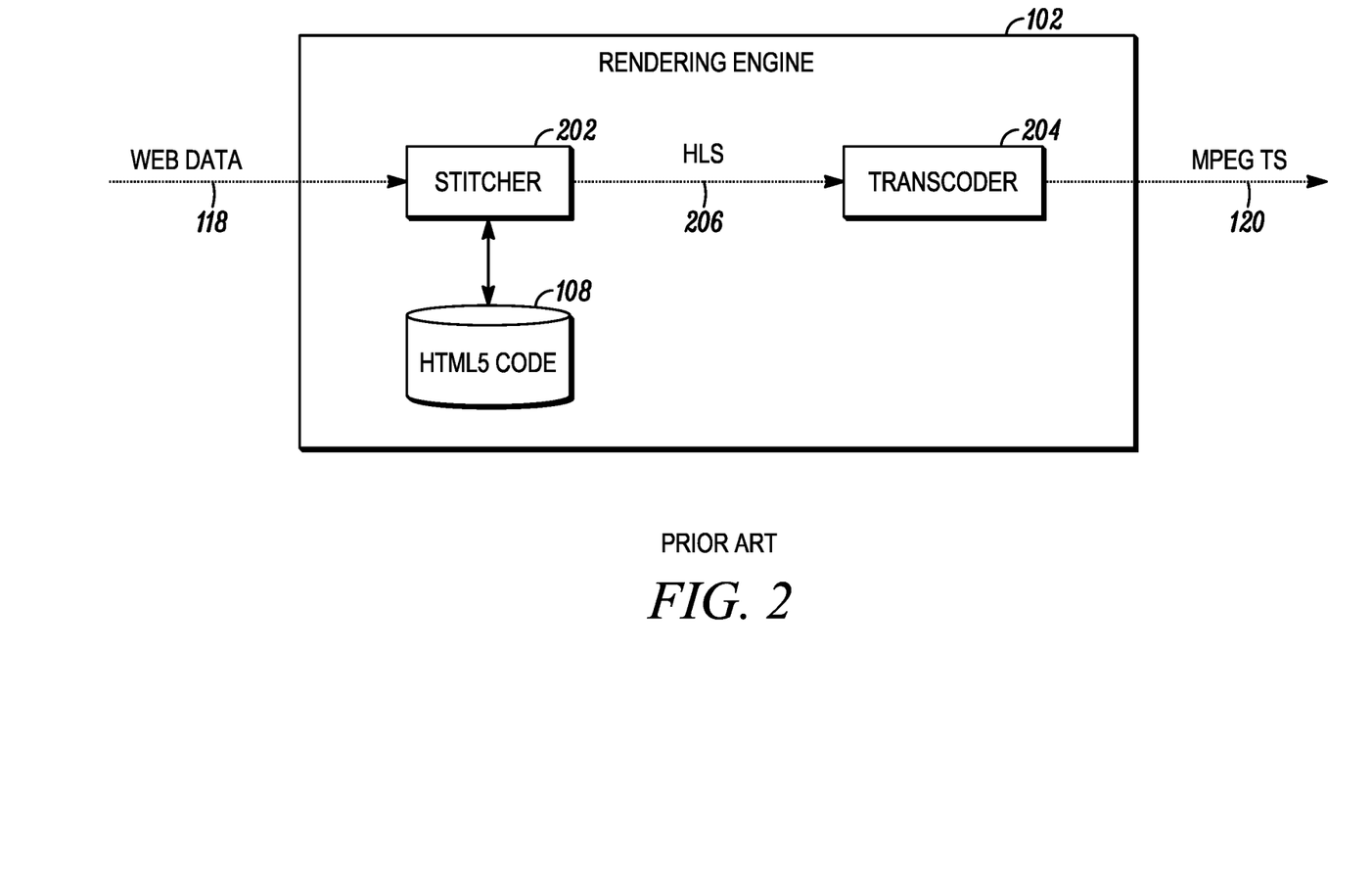
FIG. 2 illustrates an exploded view of prior art rendering engine of FIG. 1.

FIG. 2 illustrates an exploded view of prior art rendering engine 102 of FIG. 1.

As shown in FIG. 2, rendering engine 102 includes a stitcher 202, HTML5 code component 108 and a transcoder 204. Stitcher 202 receives web data 118 from web content source provider 104. Web data 118 is in an HTML format. Stitcher 202 obtains the HTML5 code from HTML5 code component 108 to generate an HLS 206. Transcoder 204 transcodes HLS 206 into and MPEG TS 120.

The MPEG TS generated by rendering engine 102 is provided to distribution network 106 to ultimately distribute the MPEG TS to a service provider, such as a cable provider. In particular, IP multicast network 110 receives the MPEG TS from rendering engine 102 and transmits a single bitrate MPEG TS.

IP multicast network 110 provides the single bitrate MPEG TS to transcoder 112 to be transcoded. For example, transcoder 112 might provide multiple versions of the single bitrate MPEG TS in different bitrates to accommodate different decoding schemes of different service provider receiver devices.

Transcoder 112 provides the multiple MPEG transport streams to IP multicast network 114, which delivers the multiple MPEG transport streams to predetermined destination IP addresses, associated with the predetermined service provider receiver devices (not shown).

ABR packaging component 116 may be located within multicast network 114, wherein ABR packaging component 116 provides ABR linear streams of the web-based-originated source content to service provider receiver devices (not shown). In this example, ABR packaging component 116 provides ABR stream 128 to the predetermined service provider receiver device (not shown).

Stream rendering system 100 is limited in its function in that its operation is limited to the specific predetermined web-based content provided by web content source provider 104, the specific arrangement of the web-based content as defined by content decisions within rendering engine 102, the specific types of multiple bitrates that the MPEG TS might be transcoded into as defined by transcoder 112 and the specific predetermined destination, i.e., the service provider receiver devices (not shown) identified by multicast network 114.

What is needed is a rendered stream providing system who's operation is not limited to one specific predetermined web-based content provided by web content source provider, is not limited to one specific arrangement of the web-based content as defined by content decisions within a single rendering engine, and is not limited the specific types of multiple bitrates that the MPEG TS might be transcoded into as predefined by a multi-bitrate transcoder and a specific predetermined destination.

A rendered stream providing system in accordance with aspects of the present disclosure has an operation that is not limited to one specific predetermined web-based content provided by web content source provider, is not limited to one specific arrangement of the web-based content as defined by content decisions within a single rendering engine, and is not limited the specific types of multiple bitrates that the MPEG TS might be transcoded into as predefined by a multi-bitrate transcoder and a specific predetermined destination.

A rendered stream providing system in accordance with aspects of the present disclosure is able to start rendering streams that are able to run indefinitely and are continuously monitored and managed. These rendering streams are able to be started, stopped, and managed for high availability. These streams are additionally able to be restarted periodically due to the typical memory leaks within the HTML5 application, mostly due to Map based Products.

A rendered stream providing system in accordance with aspects of the present disclosure includes a rendering stream controller (RSC) that manages and monitors processes for each session and providing operational management for the sessions. The RSC also enables start/stop/restart of sessions and monitors status of rendering sessions that generate MPEG transport streams.

In other words, a rendered stream providing system in accordance with aspects of the present disclosure enables creation and control of a plurality of rendering engines, wherein each engine is able to generate a video stream, from a respectively distinct website, for delivery to a respective service provider. For example, one rendering engine might obtain a video, tabulated data, a live stream and a third party advertisement from a website and convert it all into a stream that is ultimately delivered to one service provider, whereas another rendering engine might obtain a different video data from a different website and convert it all into a stream that is ultimately delivered to another service provider.

Aspects of the present invention will now be described with reference to FIGS. 3-4.

Figure 3:
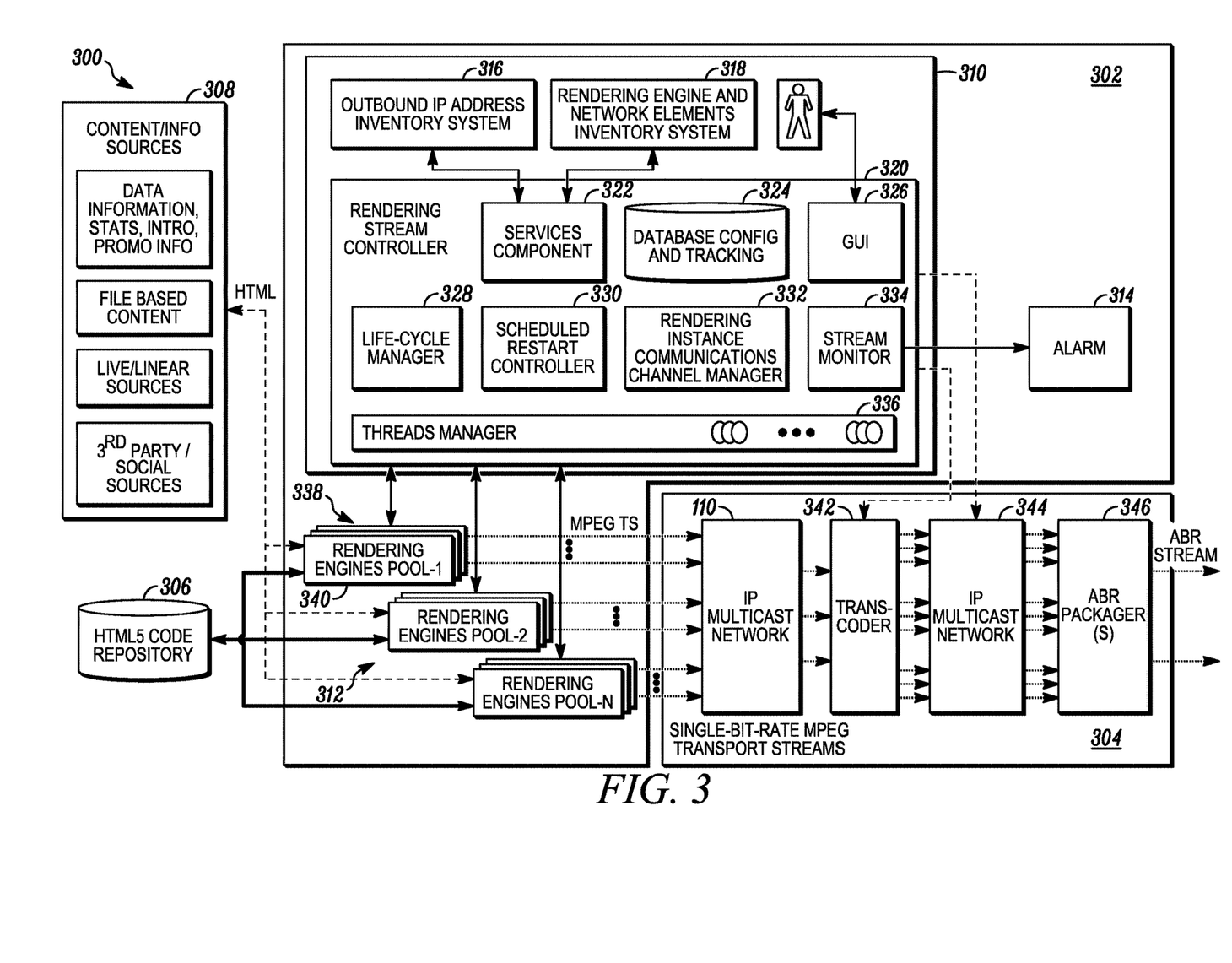
FIG. 3 illustrates a rendered stream providing system in accordance with aspects of the present disclosure.

FIG. 3 illustrates a rendered stream providing system 300 in accordance with aspects of the present disclosure.

As shown in the figure, rendered stream providing system 300 includes a rendering stream provider 302, a distribution network 304, an HTML5 code repository 306 and web content source provider 308.

In this example, rendering stream provider 302 and HTML5 code repository 306 are illustrated as individual devices. However, in some embodiments, rendering stream provider 302 and HTML5 code repository 306 may be combined as a unitary device. Further, in some embodiments, at least one of rendering stream provider 302 and HTML5 code repository 306 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an application specific integrated circuit ("ASIC"). In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network.

In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

The OSI model includes seven independent protocol layers: (1) Layer 1, the physical layer, which defines electrical and physical specifications for devices, and the relationship between a device and a transmission medium, such as a copper or fiber optical cable; (2) Layer 2, the data link layer, which provides the functional and procedural means for the transfer of data between network entities and the detection and correction of errors that may occur in the physical layer; (3) Layer 3, the network layer, which provides the functional and procedural means for transferring variable length data sequences from a source host on one network to a destination host on a different network (in contrast to the data link layer which connects hosts within the same network), and performs network routing functions and sometimes fragmentation and reassembly; (4) Layer 4, the transport layer, which provides transparent transfer of data between end users, providing reliable data transfer services to the upper layers by controlling the reliability of a given link through flow control, segmentation/desegmentation, and error control; (5) Layer 5, the session layer, which controls the connections (interchanges) between computers, establishing, managing and terminating the connections between the local and remote applications; (6) Layer 6, the presentation layer, which establishes context between application layer entities, by which the higher-layer entities may use different syntax and semantics when the presentation service provides a mapping between them; and (7) Layer 7, the application layer, which interacts directly with the software applications that implement the communicating component.

Generic Stream Encapsulation (GSE) provides a data link layer protocol, which facilitates the transmission of data from packet oriented protocols (e.g., Internet protocol or IP) on top of a unidirectional physical layer protocol (e.g., DVB-S2, DVB-T2 and DVB-C2). GSE provides functions/characteristics, such as support for multi-protocol encapsulation (e.g., IPv4, IPv6, MPEG, ATM, Ethernet, VLANs, etc.), transparency to network layer functions (e.g., IP encryption and IP header compression), and support of several addressing modes, a mechanism for fragmenting IP datagrams or other network layer packets over baseband frames, and support for hardware and software filtering.

In a layered system, a unit of data that is specified in a protocol of a given layer (e.g., a "packet" at the network layer), and which includes protocol-control information and possibly user data of that layer, is commonly referred to as a "protocol data unit" or PDU. At the network layer, data is formatted into data packets (e.g., IP datagrams, Ethernet Frames, or other network layer packets).

Rendering stream provider 302 includes a rendering stream controller (RSC) 310, a plurality of rendering engine pools 312 and an alarm 314.

In this example, RSC 310, the plurality of rendering engine pools 312 and alarm 314 are illustrated as individual devices. However, in some embodiments, at least two of RSC 310, the plurality of rendering engine pools 312 and alarm 314 may be combined as a unitary device. Further, in some embodiments, at least one of RSC 310, the plurality of rendering engine pools 312 and alarm 314 may be implemented as a computer having tangible computer-readable media for carrying or having computer-executable instructions or data structures stored thereon.

RSC 310 includes an outbound IP address inventory system 316, a rendering engine and network elements (RENE) inventory system 318 and a rendering stream controller (RSC) component 320.

In this example, outbound IP address inventory system 316, RENE inventory system 318 and RSC component 320 are illustrated as individual devices. However, in some embodiments, at least two of outbound IP address inventory system 316, RENE inventory system 318 and RSC component 320 may be combined as a unitary device. Further, in some embodiments, at least one of outbound IP address inventory system 316, RENE inventory system 318 and RSC component 320 may be implemented as a computer having tangible computer-readable media for carrying or having computer-executable instructions or data structures stored thereon.

RSC component 320 includes a services component 322, a database configuration and tracking (DCT) component 324, a graphic user interface (GUI) 326, a life-cycle manager 328, a scheduled restart controller 330, a rendering instance communications channel manager 332, a stream monitor 334 and a thread manager 234.

In this example, services component 322, DCT component 324, GUI 326, life-cycle manager 328, scheduled restart controller 330, rendering instance communications channel manager 332, stream monitor 334 and thread manager 336 are illustrated as individual devices. However, in some embodiments, at least two of services component 322, DCT component 324, GUI 326, life-cycle manager 328, scheduled restart controller 330, rendering instance communications channel manager 332, stream monitor 334 and thread manager 336 may be combined as a unitary device. Further, in some embodiments, at least one of services component 322, DCT component 324, GUI 326, life-cycle manager 328, scheduled restart controller 330, rendering instance communications channel manager 332, stream monitor 334 and thread manager 336 may be implemented as a computer having tangible computer-readable media for carrying or having computer-executable instructions or data structures stored thereon.

A sample of the plurality of rendering engine pools 312 are indicated as rendering engine pool 338. Rendering engine pool 338 includes a pool of a plurality of rendering engines, a sample of which is indicated as rendering engine 340.

In this example, each of the plurality of rendering engine pools 312 is illustrated as an individual pool. However, in some embodiments, at least two of the plurality of the plurality of rendering engine pools 312 may be combined as a unitary pool. Further, in some embodiments, at least one of the plurality of rendering engine pools 312 may be implemented as a computer having tangible computer-readable media for carrying or having computer-executable instructions or data structures stored thereon.

Distribution network 304 includes an IP multicast network 110, a transcoder 342, a network 344 and an ABR packaging component 346.

Figure 4:
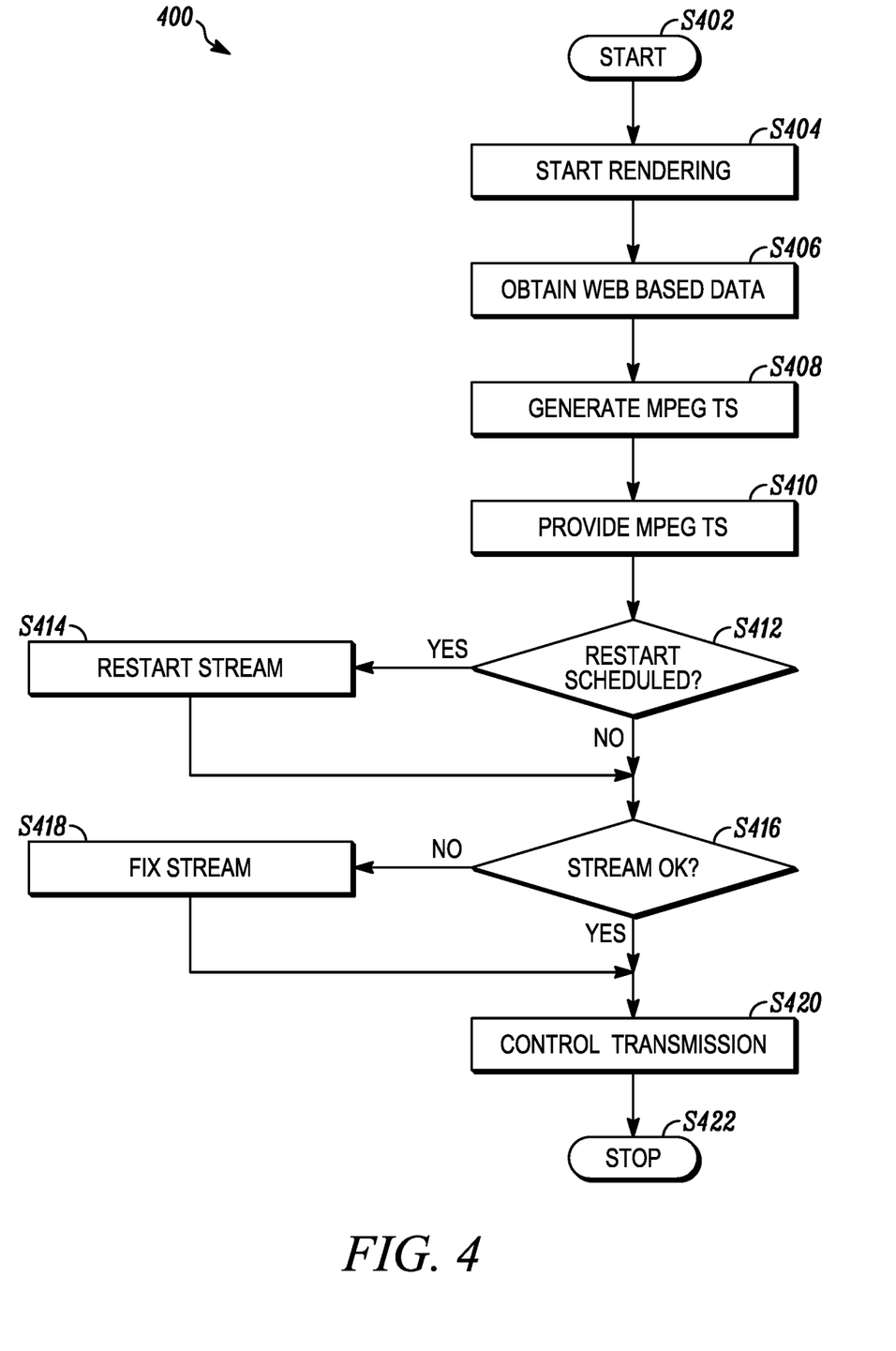
FIG. 4 illustrates a method of operating the rendered stream providing system of FIG. 3 in accordance with aspects of the present disclosure.

FIG. 4 illustrates a method 400 of operating rendered stream providing system 300 of FIG. 3 in accordance with aspects of the present disclosure.

As shown in FIG. 4, method 400 starts (S402) and rendering is started (S404). In an example embodiment, rendering stream provider 302 initiates the generation of a rendered MPEG TS.

For example, returning to FIG. 3, RSC component 320 may be any device or system that is operable to manage the plurality of rendering engine pools 312 and manage distribution network 304. As will be described in greater detail below, RSC component 320 additionally provides the following functions. RSC component 320: manages rendering engine inventory that are used to execute HTML5 Code and produce MPEG transport streams containing video products; provides configuration of rendering engine to rendering pool type mappings; provides configuration of rendering pool type to HTML code mappings, in cases where specific HTML code may require specific types of rendering engines that are contained in a pool type; provides configuration of HTML code type designations (Dev, Test, Production); enables configuration of the rendering engines, pool types and the HTML code and code versions to use for the rendering streams; provides an operational GUI and to manage and monitor the rendering streams; stores active configuration for the rendering engines and rendering streams and logs changes; provides communications path to each rendering instance for configuration updates, state change notices and to send control commands to running rendering instances; provides life-cycle control of the rendering streams (Startup, Rendering, Idle, Stopped, Change, Restart); provides health monitoring of rendering engines and raises alarms, logs events and initiates restarts as needed; provides graceful and scheduled restarts of the rendering streams that will restart the rendering streams without impacting a product rendering; and optionally updates the configuration of the transcoding and ABR packager for new rendering streams as needed to meet outbound Video/Audio format needs.

For purposes of discussion, let the desired ABR linear stream correspond to a popular sports website. In other words, rendered stream providing system 300 will transform HTML web-based content the website to an MPEG TS.

Further, in this example, each of the plurality of rendering engine pools 312 is ready for configuration. In this example, rendering engine 340 will be used to generate an MPEG TS from web data from the popular sports website. However, it should be known that rendered stream providing system 300 is able to configure, monitor and control a plurality of rendering engines in order to provide a plurality of independent MPEG transport streams from a plurality of different web data from different web sites.

Each pool of rendering engines in the plurality of rendering engine pools is a group of rendering engines of a similar type. For example, rendering engine pool 338 might be a pool of rendering engines that are configured to process high graphics data, whereas another rendering engine pool might be configured to compute a high number of computations, whereas another rendering engine pool might be configured to process low resolution images.

Services component 322 may be any device or system that is operable to: control DCT component 324, GUI 326, life-cycle manager 328, scheduled restart controller 330, rendering instance communications channel manager 332, stream monitor 334 and thread manager 336; configure each rendering engine in the plurality of rendering engine pools 312; and configure transcoder 342 and network 344.

Outbound IP address inventory system 316 may be any device or system that is operable to store a plurality of outbound IP addresses that are associated with end user service providers.

Initially, services component 322 determines the desired outbound IP addresses from outbound IP address inventory system 316. The desired outbound IP addresses are for network 344 to ultimately send the MPEG transport streams to the end user service providers.

RENE inventory system 318 may be any device or system that is operable to store information for formatting a rendering engine, for configuring transcoder 342 and for configuring network 344 to provide a desired MPEG TS from a desired website content source to a desired the end user service providers.

Services component 322 determines the information for configuring a rendering engine, for configuring transcoder 342 and for configuring network 344 to provide a desired MPEG TS from a desired website content source to a desired end user service provider. The desired outbound IP addresses are for the desired end user service providers.

Thread manager 336 may be any device or system that is operable to establish communication paths between RSC component 320 each rendering engine within the plurality of rendering engine pools 312.

Services component 322 instructs thread manager to establish a communication path between RSC component 320 and each rendering engine. For purposes of discussion, let rendering engine pool 338 be the pool of rendering engines that is configures to provide a plurality of MPEG transport streams based on web content from web content source provider 308. Further, in order to simplify the discussion, let rendering engine 340 be responsible for producing one specific MPEG TS, which will be discussed for the remainder of this example. It should be noted however, that other rendering engines within rendering engine pool 338 will additionally be similarly rendering MPEG transport streams. Still further, other rendering engine pools within the plurality of rendering engine pools 312 may be configured to render MPEG transport streams based on web content from other web content source providers (not shown).

Services component 322 additionally instructs life-cycle manager 328 to instruct, via the newly established communication path, rendering engine 340 to start a new MPEG TS. The instruction will include the desired web source content and the desired outbound IP addresses as obtained from outbound IP address inventory system 316. The instruction will additionally include the information for configuring rendering engine 340, for configuring transcoder 342 and for configuring network 344 as obtained from RENE inventory system 318.

DCT component 324 may be any device or system that is operable to store and manage information related to streams created by the plurality of rendering engine pools 312.

Services component 322 stores information into DCT component 324. In particular, services component 322 stores, into DCT component 324: the desired web source content and the desired outbound IP addresses as obtained from outbound IP address inventory system 316 for the stream that is to be created; the information for configuring rendering engine 340, for configuring transcoder 342 and for network 344 as obtained from RENE inventory system 318; the information of the newly created communication path with rendering engine 340; and the information identifying rendering engine 340 of the plurality of rendering engine pools 312 as the rendering engine 340 that is responsible for generating the desired MPEG TS.

Rendering instance communications channel manager 332 may be any device or system that is operable to create and maintain an inband communication channel to a respective rendering engine after the respective rendering engine has started sending an MPEG TS. In this manner, services component 322 is able to send commands directly to the respective rendering engine. For example, services component 322 may instruct a specific rendering engine to stop playing a stream and start playing a new stream.

Stream monitor 334 may be any device or system that is operable to monitor each generated MPEG TS.

Services component 322 instructs stream monitor 334 to start monitoring the MPEG TS that will be generated by rendering engine 340.

Life-cycle manager 328 may be any device or system that is operable to start and to stop creation of MPEG TS by each rendering engine with the plurality of rendering engine pools 312. Life-cycle manager 328 instructs rendering engine 340 to start an MPEG TS.

Returning to FIG. 4, after the rendering is started (S404), the web-based data is obtained (S406). In an example embodiment, services component 322 instructs rendering engine 340 to obtain the web-based data.

For example, returning to FIG. 3, in operation, after rendering engine 340 receives the instruction, from life-cycle manager 328, to start a new MPEG TS, rendering engine 340 accesses web content source provider 308 to obtain the web content.

HTML5 code repository 306 may be any device or system that is operable to store and manage HTML5 code required to assemble web content into HLS. HTML5 code repository 306 is similar to HTML5 code component 108 discussed above with reference to FIG. 1. However, in rendered stream providing system 300, the each engine of the plurality of rendering engine pools 312 share access to the HTML5 code stored in HTML5 code repository 306.

Returning to FIG. 4, after the web-based data is obtained (S406), an MPEG TS is generated (S408). In an example embodiment, a single rendering engine, of the plurality of rendering engine pools 312, operates in a manner similar to rendering engine 102 discussed above with reference to FIG. 2. A rendering engine, of the plurality of rendering engine pools 312, differs from rendering engine 102 in that a rendering engine, of the plurality of rendering engine pools 312, is operable to be configured and controlled by RSC component 320, and is operable to obtain HTML5 code from HTML5 code repository 306 in accordance with instructions from RSC component 320.

Returning to FIG. 4, after the MPEG TS is generated (S408), the MPEG TS is provided (S410). In an example embodiment, distribution network 304 provides the MPEG TS to the service provider.

For example, returning to FIG. 3, the MPEG TS generated by rendering engine 340 is provided to distribution network 304, to ultimately distribute the MPEG TS to service provider (not shown). In particular, IP multicast network 110 transmits the MPEG TS as a single bitrate MPEG TS to transcoder 342. For example, transcoder 342 might change the frame rate, resolution and/or the video codec of the MPEG TS.

Services component 322 of RSC 320 instructs transcoder 342 as to how to transcode the MPEG TS that is generated by rendering engine 340. Further, services component 322 updates information related to how the MPEG TS that is generated by rendering engine 340 is to be transcoded by transcoder 342 in DCT 324.

It should be noted that in accordance with aspects of the present disclosure, many distinct MPEG transport streams will be concurrently running, monitored and controlled through the plurality of rendering engine pools 312. Accordingly, transcoder 342 is operable to transcode each of the distinct MPEG transport streams in a manner respectively dictated by services component 322 of RSC 320. Further, services component 322 updates information related to how each MPEG TS that is generated by a respective rendering engine of the plurality of rendering engine pools 312 is to be transcoded by transcoder 342 in DCT 324.

Transcoder 342 then sends the transcoded MPEG TS to network 344. At that point, network 344 may provide the MPEG TS to ABR packaging component 346 to be packages as an ABR stream for distribution to the service provider. Network 344 may provide the MPEG TS to ABR packaging component 346 by way of direct point-to-point fiber or IP connection and/or a secure tunnel over the Internet.

Returning to FIG. 4, after the MPEG TS is provided (S410), it is determined whether a restart is scheduled (S412). In an example embodiment, scheduled restart controller 330 determines whether a restart is scheduled.

For example, returning to FIG. 3, scheduled restart controller 330 may be any device or system that is operable to manage a restart of a rendering engine.

There may be situations where a rendering engine should be stopped and restarted, a non-limiting example of which includes correction for a known memory leak over time. For this reason, services component 322 may instruct scheduled restart controller 330 to stop a rendering engine at a predetermined time, or after a predetermined event, and then restart the rendering engine. Scheduled restart controller may then detect when the predetermined time arrives, e.g., after 24 hours, or the predetermined event occurs, e.g., a detected memory leak reaches a predetermined threshold.

Returning to FIG. 4, if it is determined that a restart is scheduled (Y at S412), then a stream is restarted (S414). In an example embodiment, scheduled restart controller 330 has detected that the predetermined time has arrived or the predetermined event has occurred and thus restarts a rendering engine.

For example, returning to FIG. 3, consider the case where rendering engine 340 is scheduled to be restarted after 24 hours of operation. After 24 hours of operation, scheduled restart controller 330 may instruct rendering engine 340, via the thread provided by threads manager 336, to "gracefully" stop. A graceful stop permits the rendering engine to stop generating an MPEG TS at a specified break point, e.g., between one content and another, such as at the end of a movie or advertisement. This is to be contrasted with a hard stop, which would stop an MPEG TS immediately. Scheduled restart controller 330 may then follow up with an instruction to rendering engine 340, via the thread provided by threads manager 336, to restart.

Returning to FIG. 4, after a stream is restarted (S414), or if it is determined that a restart is not scheduled (N at S412), it is determined whether a stream is operating properly (S416). In an example embodiment, as mentioned above and illustrated in FIG. 3, stream monitor 334 monitors the rendering engines to determine proper functioning.

Consider the situation where rendering engine 340 is malfunctioning, or all together stops generating the MPEG TS. Stream monitor 334 will detect such malfunctioning or stoppage and instruct scheduled restart controller 330 to restart rendering engine 340.

Returning to FIG. 4, if it is determined that a stream is not operating properly (N at S416), then a stream is corrected (S412). In an example embodiment, scheduled restart controller 330 instructs the rendering engine to restart. In another example embodiment, services component starts a new rendering engine to provide the MPEG TS.

For example, returning to FIG. 3, in the case where rendering engine 340 is merely malfunctioning, scheduled restart controller 330 may instruct rendering engine 340, via the thread provided by treads manager 336, to gracefully top. Scheduled restart controller 330 may then follow up with an instruction to rendering engine 340, via the thread provided by threads manager 336, to restart. Such stop/restart instructions may be provided a predetermined number of times in order to correct the malfunction of rendering engine 340. If stream monitor 334 determines that rendering engine 340 fails to properly operate after the predetermined number of restarts, stream monitor 334 may inform services component 322 of the malfunction. At that point, services component 322 may initiate a new rendering engine of plurality of the rendering engine pool 338 to generate the MPEG TS that was previously generated by rendering engine 340.

Further, at this point, alarm 314 may indicate the problem of rendering engine 340. Alarm 314 may be any device or system that is operable to provide notification of the status of any one of the plurality of rendering engine pools 312. Non-limiting examples of types of notification includes current status or errors. Notification may take the form of an image, a sound or combination thereof. Further, alarm 314 may transmit the notification to a remote receiver by any known method.

Returning to FIG. 4, after a stream is corrected (S418), or if it is determined that a stream is operating properly (Y at S416), then transmission is controlled (S420). In an example embodiment, services component 322 modifies transmission as needed.

For example, returning to FIG. 3, services component 322 may send direct instructions to transcoder 342 so as to modify at least one of the frame rate, resolution and/or video codec. Otherwise, transcoder 342 functions in a manner similar to transcoder 112 discussed above with reference to FIG. 1.

Further, services component 322 may send direct instructions to network 344 to direct the MPEG TS to a newly identified service provider. Otherwise, network 344 functions in a manner similar to networking 114 discussed above with reference to FIG. 1.

Returning to FIG. 4, after transmission is controlled (S420), method 400 stops (S422).

It should be noted that RSC component 320 may be operated by a user by way of GUI 326. GUI 326 may be any device or system that is operable to enable a user to access and RSC component 320. GUI 326 may include one or more layers including a human-machine interface (HMI) machines with physical input hardware such a keyboards, mice, game pads and output hardware such as computer monitors, speakers, and printers. Additional UI layers in GUI 326 may interact with one or more human senses, including: tactile UI (touch), visual UI (sight), and auditory UI (sound).

A prior art stream rendering system, as discussed above with reference to FIG. 1, is created to convert specific web content to a specific MPEG TS for delivery to a specific service provider. On the contrary, a rendering stream providing system in accordance with aspects of the present disclosure enables the configuration, controlling, managing and monitoring of a plurality of distinct MPEG rendered stream sessions. The rendering stream providing system in accordance with aspects of the present disclosure supports independent and distinct start, stop, restart and status operations of each of the plurality of distinct sessions. It also constantly monitors every one of the streaming sessions and restarts them as needed.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A rendering stream distributor controller for use with a plurality of content sources, a HTML code repository, a plurality of video rendering engines and a distribution network, the plurality of content sources being operable to provide a plurality of respective sets of HTML content data, the HTML code repository being operable to provide a plurality of sets of HTML code, each set operable to instruct a respective video rendering engine to encode at least one said respective set of HTML content data received from a respective one of the plurality of content sources into a MPEG transport stream, and in a desired visual arrangement in the MPEG transport stream independent of desired visual arrangements instructed by other ones of said plurality of sets of HTML code, each of the plurality of video rendering engines being operable to obtain a respective one of the plurality of sets of HTML content data, a respective one of the plurality of sets of HTML code and to output a respective MPEG transport stream onto the distribution network, said rendering stream distributor controller comprising:
    an outbound IP address inventory system having a plurality of outbound IP addresses stored therein;
    a video rendering engine and network elements inventory system having stored therein, a plurality of HTML content identification data associated with the respective plurality of respective sets of HTML content data; and
    a rendering stream controller,
    wherein said rendering stream controller is operable to provide a stream instruction, based on one of the plurality of outbound IP addresses, one of the plurality of HTML content identification data, and one of the plurality of sets of HTML code so as to instruct one of the plurality of video rendering engines to output an MPEG transport stream.

2. The rendering stream distributor controller of claim 1, wherein said rendering stream controller is further operable to generate a second stream instruction based on a second one of the plurality of outbound IP addresses, a second one of the plurality of HTML content identification data and a second one of the plurality of HTML identification data so as to instruct a second one of the plurality of video rendering engines to output a second MPEG transport stream.

3. The rendering stream distributor controller of claim 2, wherein said rendering stream controller comprises a life-cycle manager operable to generate a start stream instruction and to generate a stop stream instruction, the start stream instruction being operable to instruct the one of the plurality of video rendering engines to start outputting of the MPEG transport stream, the stop stream instruction being operable to instruct the one of the plurality of video rendering engines to stop outputting of the MPEG transport stream based on the stop stream instruction.

4. The rendering stream distributor controller of claim 3, wherein said rendering stream controller further comprises a scheduled restart controller operable to generate a restart instruction that is operable to instruct the video rendering engine to restart outputting of a stopped MPEG transport stream.

5. The rendering stream distributor controller of claim 4, wherein said rendering stream controller further comprises an alarm operable to provide notification of a status of any one of the plurality of video rendering engines.

6. The rendering stream controller of claim 1, wherein said rendering stream controller comprises a life-cycle manager operable to generate a start stream instruction and to generate a stop stream instruction, the start stream instruction being operable to instruct the one of the plurality of video rendering engines to start outputting of the MPEG transport stream, the stop stream instruction being operable to instruct the one of the plurality of video rendering engines to stop outputting of the MPEG transport stream based on the stop stream instruction.

7. The rendering stream controller of claim 6, wherein said rendering stream controller further comprises a scheduled restart controller operable to generate a restart instruction that is operable to instruct the video rendering engine to restart outputting of a stopped MPEG transport stream.

8. A method comprising:
providing, via a plurality of content sources, a plurality of respective sets of HTML content data;
providing, via a HTML code repository, a plurality of sets of HTML code;
storing, into an outbound IP address inventory system, a plurality of outbound IP addresses;
storing, into a video rendering engine and network elements inventory system, a plurality of HTML content identification data associated with the respective plurality of respective sets of HTML content data;
providing, via a rendering stream controller, a stream instruction based on one of the plurality of outbound IP addresses, one of the plurality of HTML content identification data, and one of the plurality of sets of HTML code so as to instruct one of the plurality of video rendering engines to encode at least one said respective set of HTML content data received from a respective one of the plurality of content sources into a MPEG transport stream, and in a desired visual arrangement in the MPEG transport stream instructed by respective one of the plurality of sets of HTML code, independent of desired visual arrangements instructed by other ones of said plurality of sets of HTML code;
obtaining, via the one of a plurality of video rendering engines, the one of the plurality of sets of HTML content data;
obtaining, via the one of the plurality of video rendering engines, the one of the plurality of sets of HTML code;
outputting, via the one of the plurality of video rendering engines, an MPEG transport stream onto the distribution network.

9. The method of claim 8, further comprising generating, via the rendering stream controller, a second stream instruction based on a second one of the plurality of outbound IP addresses, a second one of the plurality of HTML content identification data and a second one of the plurality of HTML identification data so as to instruct a second one of the plurality of video rendering engines to output a second MPEG transport stream.

10. The method of claim 9, further comprising:
generating, via a life-cycle manager, a start stream instruction; and
generating, via the live-cycle manager, a stop stream instruction,
wherein the start stream instruction is operable to instruct the one of the plurality of video rendering engines to start outputting of the MPEG transport stream, and
wherein the stop stream instruction is operable to instruct the one of the plurality of video rendering engines to stop outputting of the MPEG transport stream based on the stop stream instruction.

11. The method of claim 10, further comprising generating, via a scheduled restart controller, a restart instruction that is operable to instruct the video rendering engine to restart outputting of a stopped MPEG transport stream.

12. The method of claim 11, wherein said rendering stream controller further comprises an alarm operable to provide notification of a status of any one of the plurality of video rendering engines.

13. The method of claim 8, wherein said rendering stream controller comprises a life-cycle manager operable to generate a start stream instruction and to generate a stop stream instruction, the start stream instruction being operable to instruct the one of the plurality of video rendering engines to start outputting of the MPEG transport stream, the stop stream instruction being operable to instruct the one of the plurality of video rendering engines to stop outputting of the MPEG transport stream based on the stop stream instruction.

14. The method of claim 13, wherein said rendering stream controller further comprises a scheduled restart controller operable to generate a restart instruction that is operable to instruct the video rendering engine to restart outputting of a stopped MPEG transport stream.

15. A non-transitory, tangible, computer-readable media having computer-readable instructions stored thereon, the computer-readable instructions being capable of being read by a computer and being capable of instructing the computer to perform the method comprising:
providing, via a plurality of content sources, a plurality of respective sets of HTML content data;
providing, via a HTML code repository, a plurality of sets of HTML code;
storing, into an outbound IP address inventory system, a plurality of outbound IP addresses;

storing, into a video rendering engine and network elements inventory system, a plurality of HTML content identification data associated with the respective plurality of respective sets of HTML content data;

providing, via a rendering stream controller, a stream instruction based on one of the plurality of outbound IP addresses, one of the plurality of HTML content identification data, and one of the plurality of sets of HTML code so as to instruct one of the plurality of video rendering engines to encode at least one said respective set of HTML content data received from a respective one of the plurality of content sources into a MPEG transport stream, and in a desired visual arrangement in the MPEG transport stream instructed by respective one of the plurality of sets of HTML code, independent of desired visual arrangements instructed by other ones of said plurality of sets of HTML code;

obtaining, via the one of a plurality of video rendering engines, the one of the plurality of sets of HTML content data;

obtaining, via the one of the plurality of video rendering engines, the one of the plurality of sets of HTML code;

outputting, via the one of the plurality of video rendering engines, an MPEG transport stream onto the distribution network.

16. The non-transitory, tangible, computer-readable media of claim 15, the computer-readable instructions being capable of instructing the computer to perform the method further comprising generating, via the rendering stream controller, a second stream instruction based on a second one of the plurality of outbound IP addresses, a second one of the plurality of HTML content identification data and a second one of the plurality of HTML identification data so as to instruct a second one of the plurality of video rendering engines to output a second MPEG transport stream.

17. The non-transitory, tangible, computer-readable media of claim 16, the computer-readable instructions being capable of instructing the computer to perform the method further comprising:

generating, via a life-cycle manager, a start stream instruction; and generating, via the live-cycle manager, a stop stream instruction, wherein the start stream instruction is operable to instruct the one of the plurality of video rendering engines to start outputting of the MPEG transport stream, and wherein the stop stream instruction is operable to instruct the one of the plurality of video rendering engines to stop outputting of the MPEG transport stream based on the stop stream instruction.

18. The non-transitory, tangible, computer-readable media of claim 17, the computer-readable instructions being capable of instructing the computer to perform the method further comprising generating, via a scheduled restart controller, a restart instruction that is operable to instruct the video rendering engine to restart outputting of a stopped MPEG transport stream.

19. The non-transitory, tangible, computer-readable media of claim 18, the computer-readable instructions being capable of instructing the computer to perform the method further comprising providing, via an alarm, notification of a status of any one of the plurality of video rendering engines.

20. The non-transitory, tangible, computer-readable media of claim 15, the computer-readable instructions being capable of instructing the computer to perform the method further comprising:

generating, via a life-cycle manager, a start stream instruction; and generating, via the live-cycle manager, a stop stream instruction, wherein the start stream instruction is operable to instruct the one of the plurality of video rendering engines to start outputting of the MPEG transport stream, and wherein the stop stream instruction is operable to instruct the one of the plurality of video rendering engines to stop outputting of the MPEG transport stream based on the stop stream instruction.

* * * * *